United States Patent
Yaghoubi et al.

(10) Patent No.: US 12,143,161 B2
(45) Date of Patent: Nov. 12, 2024

(54) CLASSIFICATION OF MICROWAVE LINK DATA

(71) Applicant: Telefonaktiebolaget LM Ericsson (publ), Stockholm (SE)

(72) Inventors: Forough Yaghoubi, Solna (SE); Sahar Tahvili, Upplands Väsby (SE); Patrik Olesen, Floda (SE); Martin Sjödin, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 135 days.

(21) Appl. No.: 17/916,878

(22) PCT Filed: Apr. 8, 2020

(86) PCT No.: PCT/EP2020/060058
§ 371 (c)(1),
(2) Date: Oct. 4, 2022

(87) PCT Pub. No.: WO2021/204379
PCT Pub. Date: Oct. 14, 2021

(65) Prior Publication Data
US 2023/0155701 A1    May 18, 2023

(51) Int. Cl.
*H04B 17/309* (2015.01)
*H04B 17/391* (2015.01)

(52) U.S. Cl.
CPC ......... *H04B 17/309* (2015.01); *H04B 17/391* (2015.01)

(58) Field of Classification Search
CPC .............................. H04B 17/309; H04B 17/391
See application file for complete search history.

(56) References Cited

U.S. PATENT DOCUMENTS

| 2005/0075078 A1* | 4/2005 | Makinen | H04L 47/2408 |
| | | | 455/67.15 |
| 2013/0129341 A1* | 5/2013 | D'Errico | H04B 10/1123 |
| | | | 398/5 |

FOREIGN PATENT DOCUMENTS

| WO | 03034639 A1 | 4/2003 |
| WO | 2014023351 A1 | 2/2014 |

OTHER PUBLICATIONS

Cheffena, Michael, et al., "On the Space-Time Variations of Rain Attenuation", IEEE Transactions on Antennas and Propagation, vol. 57, No. 6, Jun. 2009, 12 pages.

(Continued)

*Primary Examiner* — Natasha W Cosme
(74) *Attorney, Agent, or Firm* — Murphy, Bilak & Homiller, PLLC

(57) ABSTRACT

There is provided mechanisms for classifying microwave link data of a microwave system comprises a point-to-point wireless microwave link. The method is performed by a controller entity. The method comprises obtaining microwave link data in terms of a set of performance affecting values for the point-to-point wireless microwave link. Each performance affecting value in the set pertains to a respective performance affecting property of the point-to-point wireless microwave link. The method comprises classifying the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

17 Claims, 5 Drawing Sheets

(56) References Cited

OTHER PUBLICATIONS

Fawaz, Hassan Ismail, et al., "Deep learning for time series classification: a review", https://doi.org/10.1007/s10618-19-00619-1, May 14, 2019, 44 pages.

Hand, David J, et al., "A Simple Generalisation of the Area Under the ROC Curve for Multiple Class Classification Problems", Machine Learning, 45, copyright 2001 Kluwer Academic Publishers., 2001, pp. 171-186.

Janssens, Olivier, et al., "Convolutional Neural Network Based Fault Detection for Rotating Machinery", Journal of Sound and Vibration 377, 2016, pp. 331-345.

Overeem, A, et al., "Measuring urban rainfall using microwave links from commercial cellular communication networks", Water Resources Research, vol. 47, WI12505, doi:10.1029/2010WR010350, 2011, 16 pages.

Polz, Julius, et al., "Rain event detection in commercial microwave link attenuation data using convolutional neural networks", Atmospheric Measurement Techniques, Discussions, https://doi.org/10.5194/amt-2019-412, 2019, 22 pages.

Sheng, Victor S, et al., "Get Another Label? Improving Data Quality and Data Mining Using Multiple, Noisy Labelers", NYU Working Paper No. 2451/25882, Mar. 2008, 9 pages.

Shin, Hoo-Chang, et al., "Deep Convolutional Neural Networks for Computer-Aided Detection: CNN Architectures, Dataset Characteristics and Transfer Learning", IEEE Transactions on Medical Imaging, vol. 35, No. 5, May 2016, 14 pages.

Wang, Lipo, et al., "A General Wrapper Approach to Selection of Class-Dependent Features", IEEE Transactions on Neural Networks, vol. 19, No. 7, Jul. 2008, 12 pages.

Youn, Eunseog, et al., "Class dependent feature scaling method using naive Bayes classifier for text datamining", Pattern Recognition Letters 30, 2009, pp. 477-485.

\* cited by examiner

CLASSIFICATION OF MICROWAVE LINK DATA

TECHNICAL FIELD

Embodiments presented herein relate to a method, a controller entity, a computer program, and a computer program product for classifying microwave link data of a microwave system comprising a point-to-point wireless microwave link.

BACKGROUND

In a microwave system, digital information is sent over point-to-point wireless microwave links between two nodes. These two nodes are typically spaced from a few hundred meters up to several kilometers. Each node comprises link equipment, such as an antenna, a radio for frequency up- and down-conversion, and a modem for digital signal processing, used for transmission and reception of microwave signals over the point-to-point wireless microwave links.

Point-to-point wireless microwave links are sometimes subjected to disturbances. Such disturbances affect the received signal power and quality. This might trigger alarms that are sent to the network operator. When a network operator suspects that the link equipment is not working properly, a common response is to make a site visit (i.e., to send maintenance personnel to inspect the link equipment). Such a site visit sometimes results in the link equipment, or at least part thereof, being shipped back to the manufacturer for maintenance, or even replacement.

It has been found during inspections that a significant fraction of the link equipment sent back to the manufacturer in fact does not suffer from impaired operation and no faults are found. This indicates that resources, such as time and money, might be saved if network operators are provided with more accurate feedback about their network equipment.

In turn, it might be challenging to separate different types of operating conditions which cause the same type of performance degradation.

Hence, there is still a need for improved identification of the operating conditions of point-to-point wireless microwave links.

SUMMARY

An object of embodiments herein is to provide efficient identification of the operating conditions of point-to-point wireless microwave links.

According to a first aspect there is presented a method for classifying microwave link data of a microwave system comprises a point-to-point wireless microwave link. The method is performed by a controller entity. The method comprises obtaining microwave link data in terms of a set of performance affecting values for the point-to-point wireless microwave link. Each performance affecting value in the set pertains to a respective performance affecting property of the point-to-point wireless microwave link. The method comprises classifying the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

According to a second aspect there is presented a controller entity for classifying microwave link data of a microwave system comprises a point-to-point wireless microwave link. The controller entity comprises processing circuitry. The processing circuitry is configured to cause the controller entity to obtain microwave link data in terms of a set of performance affecting values for the point-to-point wireless microwave link. Each performance affecting value in the set pertains to a respective performance affecting property of the point-to-point wireless microwave link. The processing circuitry is configured to cause the controller entity to classify the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

According to a third aspect there is presented a controller entity for classifying microwave link data of a microwave system comprises a point-to-point wireless microwave link. The controller entity comprises an obtain module configured to obtain microwave link data in terms of a set of performance affecting values for the point-to-point wireless microwave link. Each performance affecting value in the set pertains to a respective performance affecting property of the point-to-point wireless microwave link. The controller entity comprises a classify module configured to classify the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

According to a fourth aspect there is presented a computer program for classifying microwave link data of a microwave system comprising a point-to-point wireless microwave link, the computer program comprising computer program code which, when run on a controller entity, causes the controller entity to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

According to a sixth aspect there is presented a microwave system comprising a point-to-point wireless microwave link and a controller entity according to any of the second or third aspects.

Advantageously these aspects provide efficient identification of the operating conditions of the point-to-point wireless microwave links.

Advantageously these aspects enable the accuracy of the weather classification model for all operating conditions to be high.

Advantageously these aspects enable the risk of misclassification to be reduced.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
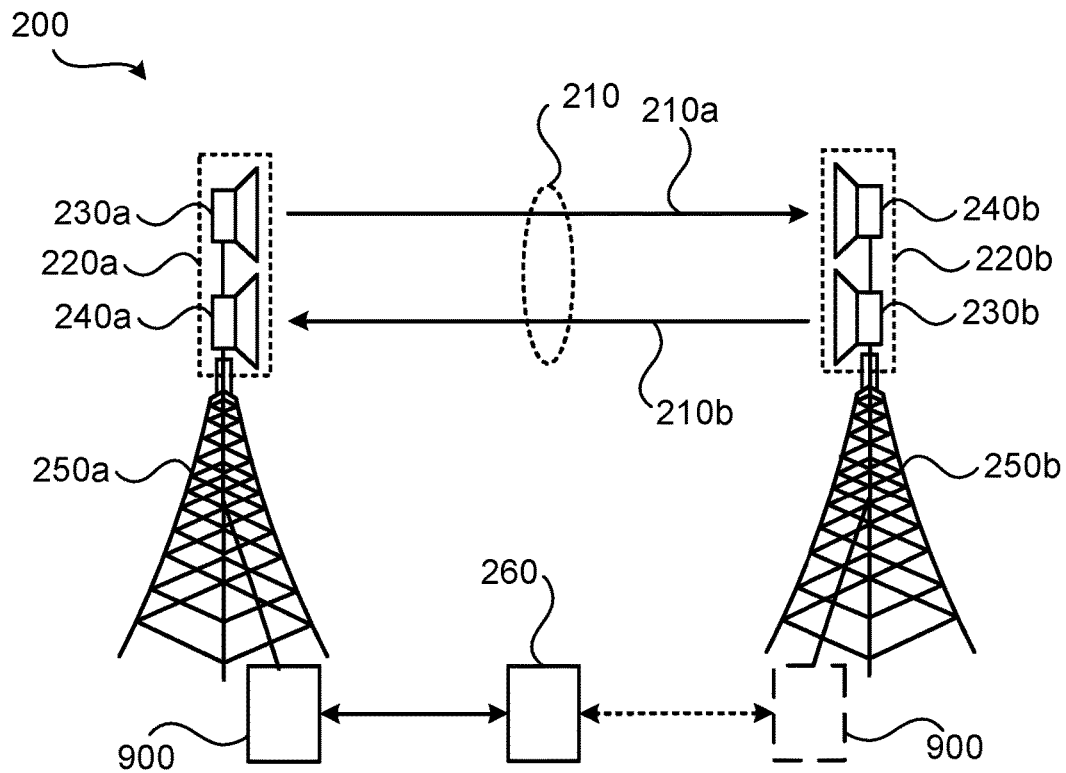
FIG. 1 is a schematic diagram illustrating a microwave system according to embodiments.

FIG. 1 is a schematic diagram illustrating a microwave system 200 where embodiments presented herein can be applied. The microwave system 200 comprises two nodes 220a, 220b configured to communicate with each other over point-to-point wireless microwave links 210, 210a, 210b. In turn, each node 220a, 220b comprises a microwave signal transmitter 230a, 230b configured for transmission of microwave link data in signals, and a microwave signal receiver 240a, 240b configured for reception of microwave link data in signals. Each node 220a, 220b might be part of a respective site 250a, 250b. Each site 250a, 250b is, via a controller entity 900, operatively connected to an operator entity 260. The operator entity 260 denotes, according to some aspects, an entity responsible for the actual operation of the microwave system 200, i.e. the entity responsible for taking action when the system's performance is not up to par. It can for example be an entity with which personnel in the network operating center (NOC) might interact, an entity running a computer program which in some examples is capable of employing machine learning techniques and/or handling traffic routing through the microwave system 200 or similar. Further aspects of the controller entity 900 will be disclosed below.

Figure 2:
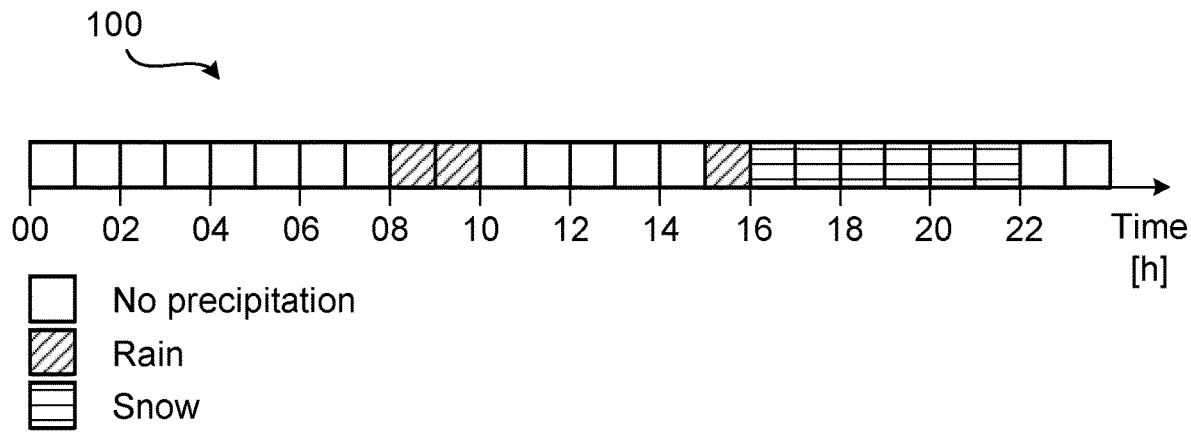
FIG. 2 schematically illustrates classified weather conditions along a time line.

As noted above there is still a need for improved identification of the operating conditions of point-to-point wireless microwave links 210, 210a, 210b and an object of embodiments disclosed herein is to provide efficient identification of the operating conditions of point-to-point wireless microwave links 210, 210a, 210b. As an illustrative example, FIG. 2 at 100 shows the resulting operating conditions, in terms of weather conditions, over time as valid for a geographical area for Mar. 31, 2019. According to the figure, between 8 am and 9 am the weather conditions was classified as rain. However, the recorded weather by Swedish Meteorological and Hydrological Institute (SMHI) for the same geographical area indicates that no rain occurred during these two hours. Hence, the operating conditions were miss-classified for this period of time.

The embodiments disclosed herein therefore relate to mechanisms for classifying microwave link data of a microwave system 200 comprising a point-to-point wireless microwave link 210, 210a, 210b. In order to obtain such mechanisms there is provided a controller entity 900, a method performed by the controller entity 900, a computer program product comprising code, for example in the form of a computer program, that when run on a controller entity 900, causes the controller entity 900 to perform the method.

Figure 3:
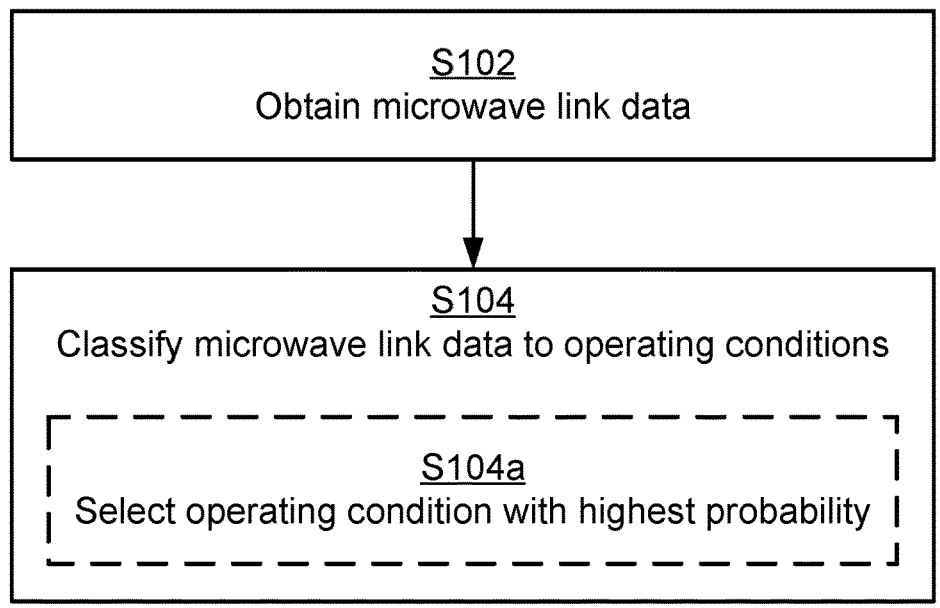
FIG. 3 is a flowchart of methods according to embodiments.

FIG. 3 is a flowchart illustrating embodiments of methods for classifying microwave link data of a microwave system 200 comprising a point-to-point wireless microwave link 210, 210a, 210b. The methods are performed by the controller entity 900. The methods are advantageously provided as computer programs 1120.

S102: The controller entity 900 obtains microwave link data in terms of a set of performance affecting values for the point-to-point wireless microwave link 210, 210a, 210b. Each performance affecting value in the set pertains to a respective performance affecting property of the point-to-point wireless microwave link 210, 210a, 210b.

S104: The controller entity 900 classifies the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

Each operating condition thus has its own feature set (in terms of a subset of the performance affecting properties) that depends on the nature of the operating condition which should be considered during classification. Wise selection of performance affecting properties in each set reduces input noise and improves the classification performance in terms of both accuracy and complexity.

Embodiments relating to further details of classifying microwave link data of a microwave system 200 comprising a point-to-point wireless microwave link 210, 210a, 210b as performed by the controller entity 900 will now be disclosed.

There could be different ways to estimate the probability values. In some aspects, each performance affecting property is associated with its own model, and the models are used to estimate the probability values. That is, in some embodiments, estimating the probability values comprises subjecting the performance affecting values of the subset of the performance affecting properties associated with each operating condition to a respective model.

Further details of how models can be used to estimate the probability values will now be disclosed. In some examples, estimating the probability value for operating condition k comprises subjecting the performance affecting values of the subset of the performance affecting properties associated with operating condition k to model k. The model k determines the probability value of the operating condition k based on these performance affecting values (i.e., the performance affecting values of the subset of the performance affecting properties associated with operating condition k).

There could be different ways in which to determine which probability values to be assigned by the models for which performance affecting values. In some aspects, training of the models is used to determine the probability values to be assigned by the models for each operating condition for a given performance affecting value. That is, in some embodiments, which probability value to be determined by each respective model is determined through training.

There could be different types of models. In some examples, each model comprises a two-dimensional convolutional neural network or a one-dimensional convolutional neural network, and training the models involves training the convolutional neural networks.

Figure 4:
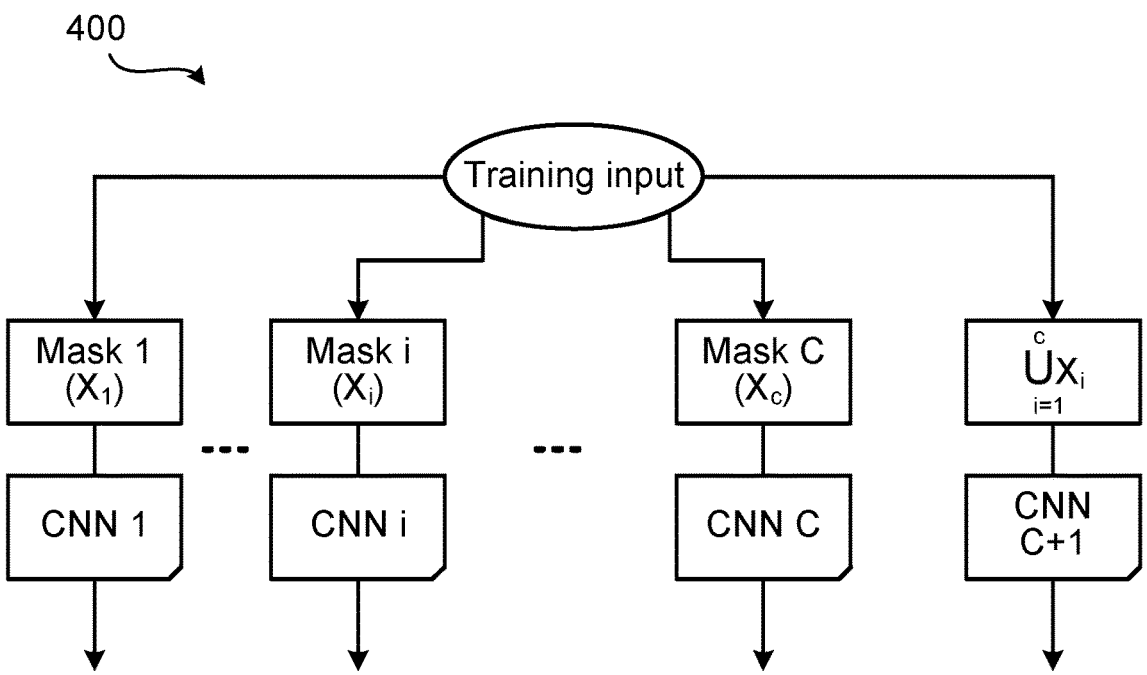
FIG. 4 schematically illustrates a scheme for training of models according to an embodiment.

Intermediate reference is here made to FIG. 4 that schematically illustrates a scheme 400 for training of models in the form of convolutional neural networks (CNNs). As disclosed above, the operating condition-dependent selection of relevant performance affecting properties is based on the fact that for each operating condition different performance affecting properties may have different importance. Assume that C is the number of operating conditions in the data set. A C-class classification problem is converted to C number of 2-class classification problems (one versus all). To train the model (implemented by CNN i) for operating condition i, the training samples of the data set (denoted Training input in FIG. 4) are divided into two classes; one class containing the samples for operating condition i and the other class consists of all other training samples. The objective is to distinguish class i with the highest accuracy from the rest of the other classes. In this method as each class has its own classifier, the number of performance affecting properties for each operating condition, and thus class, can vary. In FIG. 4, the performance affecting properties that are used by each model are illustrated as a feature mask. That is, the performance affecting properties used by the convolutional neural network for model i are defined by feature mask i (in FIG. 4 denoted Mask i) that thus only passes the performance affecting values of those performance affecting properties used by the convolutional neural network for model i (in FIG. 4 illustrated by $(X_i)$ for Mask i).

Further in this respect, there could be different ways to select which performance affecting properties to be included in which subset. In some aspects this is determined through training by observing which performance affecting properties that affect which operating conditions. This could be achieved by determining a dependency score between each performance affecting property and each operating conditions. However, in other aspects such training is avoided and the subset of the performance affecting properties is determined by an expert system. That is, in some embodiments, which subset of the performance affecting properties to be associated with which of the operating conditions is determined according to an expert system. The expert system in turn could be trained with information from the microwave system 200.

In further aspects, the classification is based on a spatial correlation of the attenuation between point-to-point wireless microwave link 210, 210a, 210b of different sites 250a, 250b. First, the k most spatially correlated point-to-point wireless microwave links are identified based on some measure of spatial correlation. Second, attenuation information of the identified spatially correlated point-to-point wireless microwave links are added to the above disclosed models. The input to the convolutional neural network has two dimensions; space and time. The input can thus be treated as a two-dimension image where the height represents time and the width represents space (or vice versa).

In some aspects, classifying the microwave link data to operating conditions in a set of operating conditions, as in action S104, involves selecting one of the operating conditions. Particularly, according to an embodiment, the controller entity 900 is configured to perform (optional) action S104a as part of action S104:

S104a: The controller entity 900 selects as the operating condition of the point-to-point wireless microwave link 210, 210a, 210b, the operating condition in the set of operating conditions having highest probability value.

In some aspects, the probability values are used as is when the controller entity 900 classifies the microwave link data to operating conditions in action S104 (and/or action S104a), but in other aspects the probability values are weighted. That is, in some embodiments, each probability value is weighted according to an operating condition specific weighting factor. The operating condition having highest weighted probability value might then be selected (in action S104a).

There could be different ways to determine the operating condition specific weighting factor for each probability value. In some embodiments, the operating condition specific weighting factor for each probability value is determined using a union of all the performance affecting values. In this respect, the C-class model might take all performance affecting values as input, and the output probabilities produced by the C-class model define the weighting factors. The weighting factors might thus be the probability values computed by the C-class model using all the performance affecting values.

Figure 5:
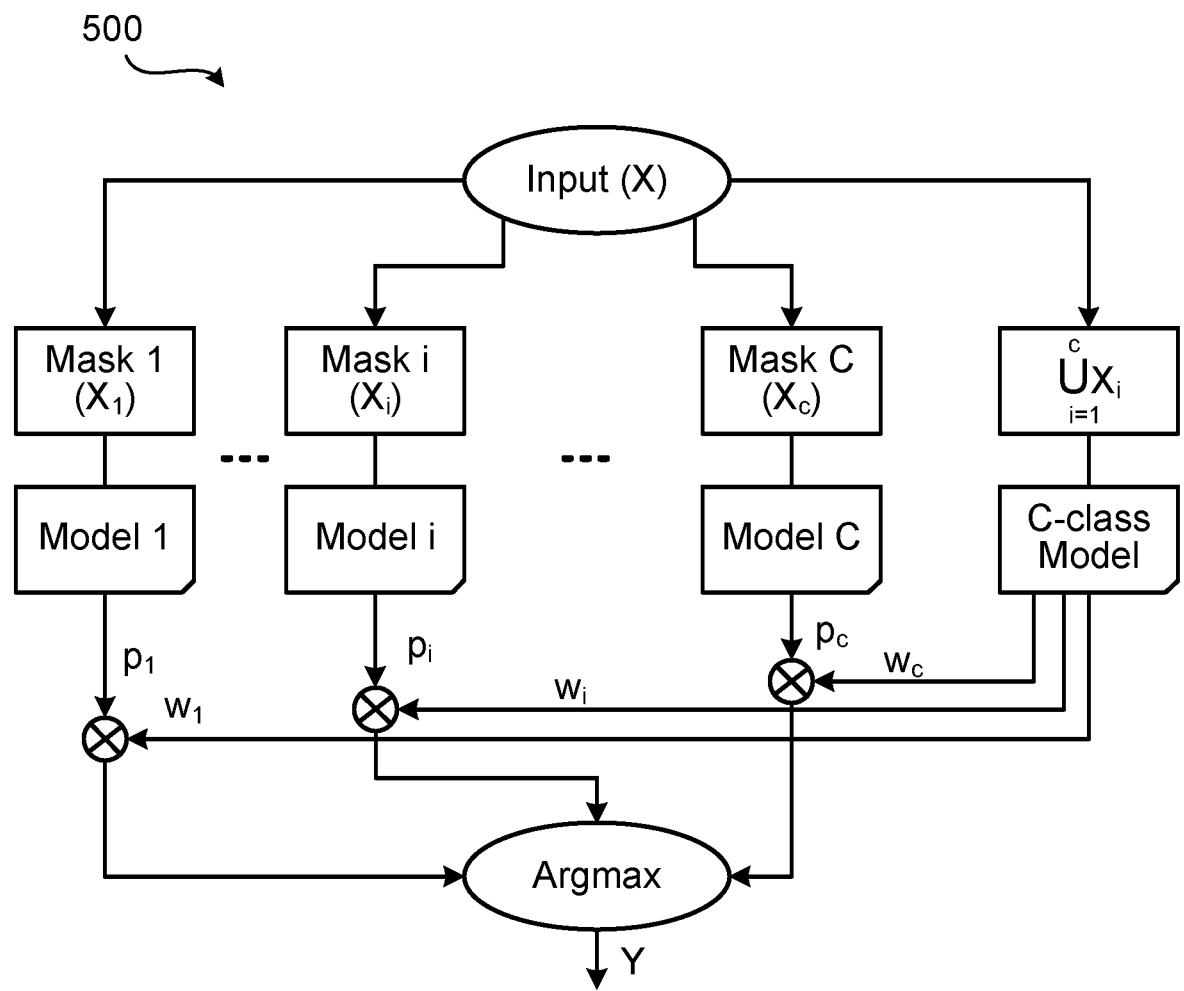
FIG. 5 schematically illustrates a scheme for selection of operating condition with highest probability value according to an embodiment.

Reference is here made to FIG. 5 that schematically illustrates a scheme 500 according to which the models as trained in FIG. 4 are used to select the operating condition with highest probability value. The differences to the scheme 400 of FIG. 4 are that for the scheme 500 the input, denoted X, is no longer sample values of a training data set knowing the operating condition but instead a set of performance affecting values for the point-to-point wireless microwave link 210, 210a, 210b as obtained by the controller entity 900 and that the probability values $p_i$ that are output from each model i are weighted with operating condition specific weighting factors $w_i$. By means of the argmax-function the operating condition, denoted Y, is then selected as the operating condition with highest weighted probability value, given by $p_i \cdot w_i$.

In some examples, the performance affecting properties pertain to at least some of: attenuation of the point-to-point wireless microwave link 210, 210a, 210b, operating frequency of the microwave system 200, length of the point-to-point wireless microwave link 210, 210a, 210b, geographical information of the microwave system 200, spatial information of the microwave system 200, antenna size of the microwave system 200, mean squared error of transmission on the point-to-point wireless microwave link 210, 210a, 210b, weather information of the microwave system 200, equalizer filter tap weights used in a receiver 240a, 240b of the microwave system 200, received power of transmission on the point-to-point wireless microwave link 210, 210a, 210b. Here the mean squared error refers to the mean squared error of demodulated signals (i.e., signals having been transmitted over the point-to-point wireless microwave link 210, 210a, 210b and then demodulated before the mean squared error is determined). In some examples, all subsets comprise the performance affecting property pertaining to attenuation of the point-to-point wireless microwave link 210, 210a, 210b.

In this respect, microwave link data values related to the operation and performance of a point-to-point wireless microwave link 210, 210a, 210b can be extracted from the microwave signal receivers 240a, 240b, the microwave signal transmitter 230a, 230b, or other radio equipment, in the nodes 220a, 220b. Examples of microwave link data that can be extracted are transmitted power level of the signal transmitted from a node, the received power of the signal received from another node, the mean squared error of the demodulated signal, the signal power before and after channel filtering, equalizer tap values, etc.

Further in this respect, the performance affecting values could in S102 be obtained as raw data or as processed data. As an illustrative example, in terms of the performance affecting property mean squared error, either performance affecting values in terms of already computed mean squared error values could be obtained or performance affecting values that by the controller entity 900 are used to by itself compute a mean squared error value can be obtained. The same applies also to the other performance affecting properties.

Some of the subsets might have the same number of members (i.e., same number of performance affecting properties) whereas the number of members might differ between some of the subsets. That is, in some embodiments, the number of performance affecting properties in the subset differ between at least two of the subsets of the performance affecting properties.

There could be different types of operating conditions. In some examples, the operating conditions pertain to: one normal operating condition of the point-to-point wireless microwave link 210, 210a, 210b, at least one performance degraded operating condition of the point-to-point wireless microwave link 210, 210a, 210b. Further, in some examples, the performance of the at least one performance degraded operating condition is degraded by an any of: rain, blocking (of one or more of the microwave signal transmitters 230a, 230b and/or microwave signal receivers 240a, 240b), multipath propagation, maintenance, restart, wind, snow, interference.

TABLE 1 shows one example of which out of eleven total performance affecting properties are part of the subset of performance affecting properties for each of nine operating conditions, where the symbol "X" denotes that the performance affecting property in a given column is part of the subset of performance affecting properties for the operating condition in a given row.

| Operating condition | (1) | (2) | (3) | (4) | (5) | (6) | (7) | (8) | (9) | (10) | (11) |
|---|---|---|---|---|---|---|---|---|---|---|---|
| Normal operation | X | X |   |   | X |   |   | X |   |   | X |
| Rain | X | X | X | X | X |   |   | X |   |   | X |
| Blocking | X |   |   |   |   |   |   |   |   |   | X |
| Multipath fading | X | X | X | X |   | X | X |   | X | X | X |
| Maintenance | X |   |   | X |   |   |   |   |   | X | X |
| Restart | X |   |   |   |   |   |   |   |   | X | X |
| Wind | X | X |   |   |   | X |   | X |   |   | X |
| Snow | X | X | X | X | X |   |   | X |   |   | X |
| Interference | X | X |   |   |   |   | X |   | X | X | X |

List of relevant performance affecting properties for each operating condition, where
(1) = attenuation,
(2) = carrier frequency,
(3) = link length,
(4) = geographical information,
(5) = spatial information,
(6) = antenna size,
(7) = mean squared error,
(8) = weather information (such as temperature, wind speed, etc.),
(9) = equalizer tap values,
(10) = received power, and
(11) = time In the following, reasoning behind the selection of performance affecting properties for some of the operating condition will be disclosed.

The mathematical definition of multipath fading shows that multipath fading strongly depends on the carrier frequency of a link; for instance, lower frequency signals generally are more susceptible to multipath propagation than higher frequency signals. In addition, the frequency in combination with the antenna diameter (and/or the number of antenna elements and their separation) determines the beam width, which also affects the likelihood of multipath fading. Other factors that affects multipath fading are the physical radio environment in which the signal is traversing as well as the length of link and the bandwidth. Multipath fading is more likely for long links with high bandwidth than for the opposite. Surfaces that reflect the signals with small loss, such as water, are conducive to the multipath fading. Cluttered environments with many edges and possible echoes cause attenuation due to multipath fading. Tap values of the equalizer filter in the receiver can also help to detect multipath fading, since the response of the equalizer filter should resemble a "spike" without multipath fading, i.e. only a small number of equalizer taps would be expected to have values deviating noticeably from zero.

Attenuation caused by rain can be modelled mathematically as $a = \alpha \cdot R^\beta \cdot d$, where a is the attenuation, R is the rain rate, and where $\alpha$ and $\beta$ are constants that depend on the carrier frequency, and d is the length of the microwave link. Moreover, since rain simultaneously can affect a large geographical area, also spatial information might be a relevant performance affecting property for the operating condition rain.

Since snow, like rain, is a form of precipitation, a similar subset of relevant performance affecting properties might be regarded as relevant for the operating condition snow as for rain. Further, temperature might be used to distinguish snow from rain; the probability for the precipitation being snow increases as the temperature drops below the freezing point.

Geographical information might be used for identifying if a given site 250a, 250b is under maintenance or not.

The antenna diameter is of relevance for the operating condition wind, as the probability of mast sway due to wind to occur increases as the diameter of the antenna increases. Moreover, the beam width, as impacted by antenna size, and the carrier frequency, are also relevant for the operating condition wind as the sensitivity to windy conditions increases as the beam width is narrowed. That is, point-to-point wireless microwave links 210, 210a, 210b using narrow beams are more sensitive to windy conditions than point-to-point wireless microwave links 210, 210a, 210b using wide beams.

The mean squared error in combination with the received power are performance affecting properties that are relevant for the detection of interference from other microwave links. Equalizer tap values could be of relevance in order to distinguish between interference and multipath fading, as multipath fading sometimes results in degraded mean squared error even if the input power to the receiver is sufficiently large. For the operating condition interference, the input power should be the same or even larger than during normal operation, but the mean squared error should be degraded.

There could be different uses of the classification. In some aspects, the classification of the microwave link data enables the controller entity 900 to determine the cause of performance degradation affecting data throughput in the microwave system 200. The performance degradation is dependent on which operating condition was selected in S104a. Some operating conditions require attention from an operator entity 260 in the microwave system 200 whereas other operating conditions do not require such attention. The controller entity 900 might therefore be configured to determine, by using information of what operating condition was selected in S104a and the cause of the performance degradation that attention from an operator entity 260 in the microwave system 200 is required. The cause is defined by the microwave link data as classified to the operating conditions. Operator feedback might then be provided only on a per need basis. Hence, the controller entity 900 might provide an indication to the operator entity 260 only when attention from the operator entity 260 is required. The indication might be an indication of the performance degradation and the cause of the performance degradation.

Figure 6:
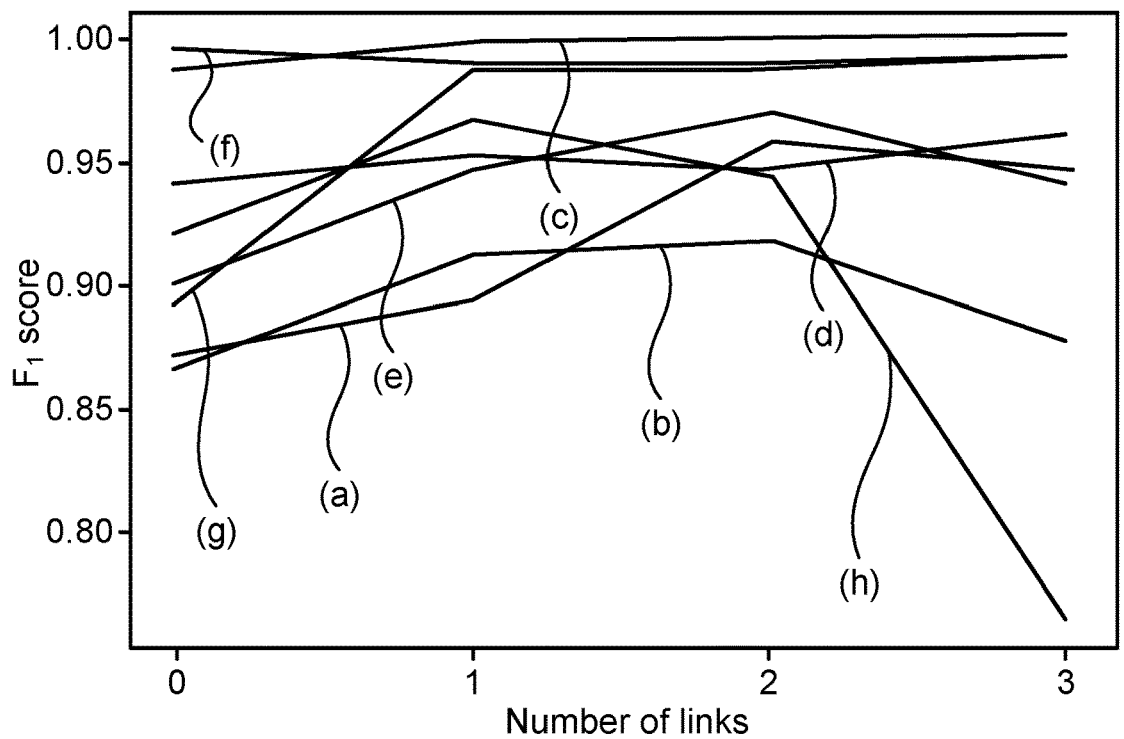
FIGS. 6 and 7 show simulation results according to an embodiment.
Figure 7:
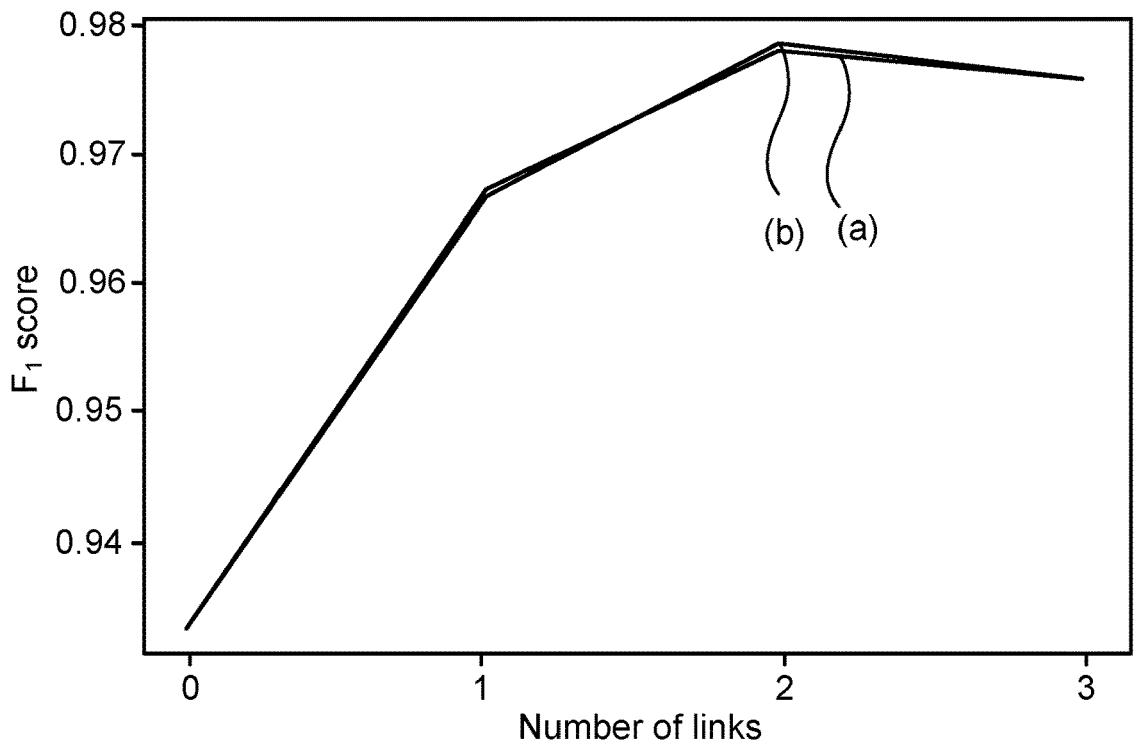

FIG. 6 and FIG. 7 show simulation results in terms of the average accuracy of the classification as a function of the number of spatially correlated point-to-point wireless microwave links 210, 210a, 210b considered by the model. The performance is quantified with the $F_1$ score. As the skilled person understands, the $F_1$ score is the harmonic mean of the precision and recall, where an $F_1$ score reaches its best value at 1 (perfect precision and recall) and worst at 0. The results of FIG. 6 are shown for the following operating conditions: (a) multipath fading, (b) blocking, (c) snow and interference, (d) restart, (e) rain, (f) normal operation, (g) wind, and (h) maintenance. The results of FIG. 7 are shown at (a) for a weighted average of the $F_1$ values in FIG. 6 and at (b) as the micro average of the $F_1$ values in FIG. 6. As can be seen, for some of the operating conditions, the accuracy increases to some extent as the number of spatially correlated point-to-point wireless microwave links 210, 210a, 210b increases whereas for other operating conditions, the accuracy decreases.

Figure 8:
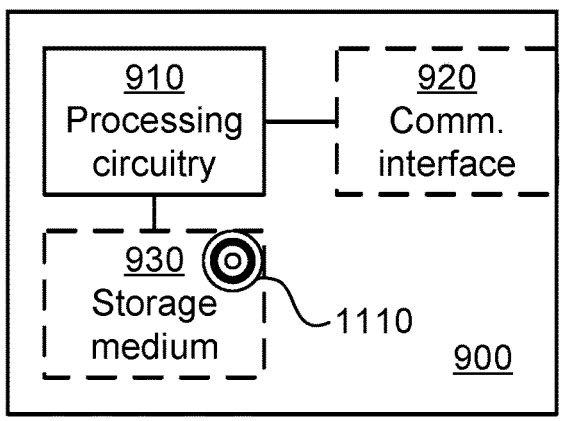
FIG. 8 is a schematic diagram showing functional units of a controller entity according to an embodiment.

FIG. 8 schematically illustrates, in terms of a number of functional units, the components of a controller entity 900 according to an embodiment. Processing circuitry 910 is provided using any combination of one or more of a suitable central processing unit (CPU), multiprocessor, microcontroller, digital signal processor (DSP), etc., capable of executing software instructions stored in a computer program product 1110 (as in FIG. 10), e.g. in the form of a storage medium 930. The processing circuitry 910 may further be provided as at least one application specific integrated circuit (ASIC), or field programmable gate array (FPGA).

Particularly, the processing circuitry 910 is configured to cause the controller entity 900 to perform a set of operations, or actions, as disclosed above. For example, the storage medium 930 may store the set of operations, and the processing circuitry 910 may be configured to retrieve the set of operations from the storage medium 930 to cause the controller entity 900 to perform the set of operations. The set of operations may be provided as a set of executable instructions.

Thus the processing circuitry 910 is thereby arranged to execute methods as herein disclosed. The storage medium 930 may also comprise persistent storage, which, for example, can be any single one or combination of magnetic memory, optical memory, solid state memory or even remotely mounted memory. The controller entity 900 may further comprise a communications interface 920 at least configured for communications with other entities, functions, nodes, and devices of the microwave system 200. As such the communications interface 920 may comprise one or more transmitters and receivers, comprising analogue and digital components. The processing circuitry 910 controls the general operation of the controller entity 900 e.g. by sending data and control signals to the communications interface 920 and the storage medium 930, by receiving data and reports from the communications interface 920, and by retrieving data and instructions from the storage medium 930. Other components, as well as the related functionality, of the controller entity 900 are omitted in order not to obscure the concepts presented herein.

Figure 9:
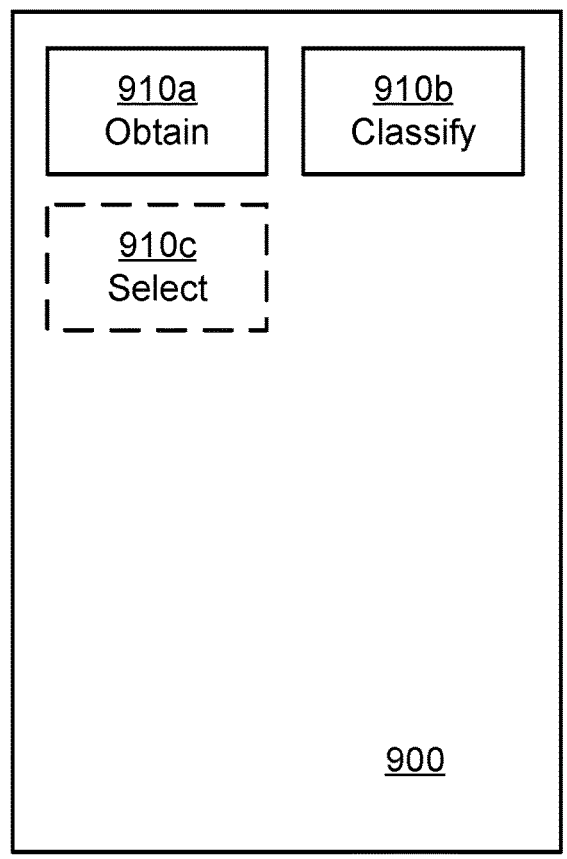
FIG. 9 is a schematic diagram showing functional modules of a controller entity according to an embodiment.

FIG. 9 schematically illustrates, in terms of a number of functional modules, the components of a controller entity 900 according to an embodiment. The controller entity 900 of FIG. 9 comprises a number of functional modules; an obtain module 910a configured to perform action S102, and a classify module 910b configured to perform action S104. The controller entity 900 of FIG. 9 may further comprise a number of optional functional modules, such as a select module 910c configured to perform action S104a. In general terms, each functional module 910a-910c may in one embodiment be implemented only in hardware and in another embodiment with the help of software, i.e., the latter embodiment having computer program instructions stored on the storage medium 930 which when run on the processing circuitry makes the controller entity 900 perform the corresponding actions mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 910a-910c may be implemented by the processing circuitry 910, possibly in cooperation with the communications interface 920 and/or the storage medium 930. The processing circuitry 910 may thus be configured to from the storage medium 930 fetch instructions as provided by a functional module 910a-910c and to execute these instructions, thereby performing any actions as disclosed herein.

The controller entity 900 may be provided as a standalone device or as a part of at least one further device. For example, the controller entity 900 may be provided in one of the nodes 220a, 220b. Alternatively, functionality of the controller entity 900 may be distributed between at least two devices, or nodes. These at least two nodes, or devices, may either be part of the same network part or may be spread between at least two such network parts. According to some aspects the controller entity 900 is a logical function that can be implemented in either a more distributed fashion (e.g. co-located with the actual microwave transmitters and receivers) or in a more central fashion (e.g. in a data center).

Thus, a first portion of the instructions performed by the controller entity 900 may be executed in a first device, and a second portion of the of the instructions performed by the controller entity 900 may be executed in a second device; the herein disclosed embodiments are not limited to any particular number of devices on which the instructions performed by the controller entity 900 may be executed. Hence, the methods according to the herein disclosed embodiments are suitable to be performed by a controller entity 900 residing in a cloud computational environment. Therefore, although a single processing circuitry 910 is illustrated in FIG. 8 the processing circuitry 910 may be distributed among a plurality of devices, or nodes. The same applies to the functional modules 910a-901c of FIG. 9 and the computer program 1120 of FIG. 10.

Figure 10:
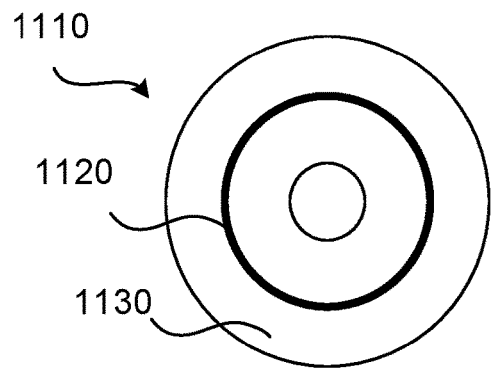
FIG. 10 shows one example of a computer program product comprising computer readable storage medium according to an embodiment.

FIG. 10 shows one example of a computer program product 1110 comprising computer readable storage medium 1130. On this computer readable storage medium 1130, a computer program 1120 can be stored, which computer program 1120 can cause the processing circuitry 910 and thereto operatively coupled entities and devices, such as the communications interface 920 and the storage medium 930, to execute methods according to embodiments described herein. The computer program 1120 and/or computer program product 1110 may thus provide means for performing any actions as herein disclosed.

In the example of FIG. 10, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for classifying microwave link data of a microwave system comprising a point-to-point wireless microwave link, the method being performed by a controller entity, the method comprising:
    obtaining microwave link data in terms of a set of performance affecting values for the point-to-point wireless microwave link, wherein each performance affecting value in the set pertains to a respective performance affecting property of the point-to-point wireless microwave link; and
    classifying the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

2. The method according to claim 1, wherein the classifying further comprises:
    selecting as the operating condition of the point-to-point wireless microwave link, the operating condition in the set of operating conditions having highest probability value.

3. The method according to claim 2, wherein each probability value is weighted according to an operating condition specific weighting factor, and wherein the operating condition having highest weighted probability value is selected.

4. The method according to claim 3, wherein the operating condition specific weighting factor for each probability value is determined using a union of all the performance affecting values.

5. The method according to claim 1, wherein estimating the probability values comprises subjecting the performance affecting values of the subset of the performance affecting properties associated with each operating condition to a respective model.

6. The method according to claim 5, wherein estimating the probability value for operating condition k comprises subjecting the performance affecting values of the subset of the performance affecting properties associated with operating condition k to model k, wherein the model k determines the probability value of the operating condition k based on these performance affecting values.

7. The method according to claim 5, wherein which probability value to be determined by each respective model is determined through training.

8. The method according to claim 7, wherein each model comprises a two-dimensional convolutional neural network or a one-dimensional convolutional neural network, and training the models involves training the convolutional neural networks.

9. The method according to claim 1, wherein which subset of the performance affecting properties to be associated with which of the operating conditions is determined according to an expert system.

10. The method according to claim 1, wherein the performance affecting properties pertain to at least some of: attenuation of the point-to-point wireless microwave link, operating frequency of the microwave system, length of the point-to-point wireless microwave link, geographical information of the microwave system, spatial information of the microwave system, antenna size of the microwave system, mean squared error of transmission on the point-to-point wireless microwave link, weather information of the microwave system, equalizer filter tap weights used in a receiver of the microwave system, received power of transmission on the point-to-point wireless microwave link.

11. The method according to claim 1, wherein all subsets comprise the performance affecting property pertaining to attenuation of the point-to-point wireless microwave link.

12. The method according to claim 1, wherein number of performance affecting properties in the subset differ between at least two of the subsets of the performance affecting properties.

13. The method according to claim 1, wherein the operating conditions pertain to: one normal operating condition of the point-to-point wireless microwave link, at least one performance degraded operating condition of the point-to-point wireless microwave link.

14. The method according to claim 13, wherein the performance of the at least one performance degraded operating condition is degraded by an any of: rain, blocking, multipath propagation, maintenance, restart, wind, snow, interference.

15. A controller entity for classifying microwave link data of a microwave system comprising a point-to-point wireless microwave link, the controller entity comprising processing circuitry, the processing circuitry being configured to cause the controller entity to:
  obtain microwave link data in terms of a set of performance affecting values for the point-to-point wireless microwave link, wherein each performance affecting value in the set pertains to a respective performance affecting property of the point-to-point wireless microwave link; and
  classify the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

16. A controller entity for classifying microwave link data of a microwave system comprising a point-to-point wireless microwave link, the controller entity comprising:
  an obtain module configured to obtain microwave link data in terms of a set of performance affecting values for the point-to-point wireless microwave link, wherein each performance affecting value in the set pertains to a respective performance affecting property of the point-to-point wireless microwave link; and
  a classify module configured to classify the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

17. A non-transitory computer-readable medium storing a computer program for classifying microwave link data of a microwave system comprising a point-to-point wireless microwave link, the computer program comprising computer code which, when run on processing circuitry of a controller entity, causes the controller entity to:
  obtain microwave link data in terms of a set of performance affecting values for the point-to-point wireless microwave link, wherein each performance affecting value in the set pertains to a respective performance affecting property of the point-to-point wireless microwave link; and
  classify the microwave link data to operating conditions in a set of operating conditions, where each operating condition is associated with its own subset of the performance affecting properties, by for each operating condition, estimating a probability value using the performance affecting values of the subset of the performance affecting properties associated with that operating condition.

* * * * *